United States Patent [19]

Lautenschlager

[11] Patent Number: 4,611,957
[45] Date of Patent: Sep. 16, 1986

[54] DRILLING AND BORING FIXTURE FOR FURNITURE HARDWARE PARTS

[75] Inventor: Karl Lautenschlager, Reinheim, Fed. Rep. of Germany

[73] Assignee: Karl Lautenschlager KG Mobelbeschlagfabrik, Reinhein, Fed. Rep. of Germany

[21] Appl. No.: 665,527

[22] Filed: Oct. 26, 1984

[30] Foreign Application Priority Data

Oct. 27, 1983 [DE] Fed. Rep. of Germany ....... 3338943

[51] Int. Cl.⁴ .............................................. B23Q 3/00
[52] U.S. Cl. ................................... 408/108; 408/109; 269/208; 269/242
[58] Field of Search ............... 408/107, 108, 103, 105, 408/109, 95; 269/208, 242, 281; 144/278; 279/112; 409/225, 903

[56] References Cited

U.S. PATENT DOCUMENTS

| 1,018,153 | 2/1912 | Bank | 408/108 |
|---|---|---|---|
| 1,766,230 | 6/1930 | Lea | 269/208 |
| 2,811,771 | 11/1957 | Ericsson | 269/208 |
| 2,881,645 | 4/1959 | Kruchten | 269/242 |
| 2,943,653 | 7/1960 | Crider | 408/108 |
| 3,225,686 | 12/1965 | Clements | 269/242 |
| 3,973,860 | 8/1976 | Kern | 408/108 |

FOREIGN PATENT DOCUMENTS

| 353734 | 7/1931 | United Kingdom | 408/108 |
|---|---|---|---|
| 859103 | 8/1981 | U.S.S.R. | 269/208 |

*Primary Examiner*—Gil Weidenfeld
*Assistant Examiner*—Daniel W. Howell

[57] ABSTRACT

A fixture for the adjustable mounting of board-like furniture parts on the work table of a drilling machine. Underneath the drilling head of the machine, backstop rails which project slightly above the supporting surface of the work table are disposed in alignment with one another and longitudinally displaceably at equal distances on opposite sides of a longitudinal central plane. The ends of a threaded spindle are threaded into the ends of the backstop rails adjacent the drilling head, the threaded spindle being provided on each half with contrary threads of equal pitch. The threaded spindle is mounted rotatably but in a longitudinally undisplaceable manner on the work table. Cursors are longitudinally displaceable on the upper sides of the backstop rails and can be fixed at given uniform distances on the associated backstop rail, and each bears a stop which is biased to a position projecting toward the surface of the work table, and which can be retracted into the cursor against the bias.

8 Claims, 12 Drawing Figures

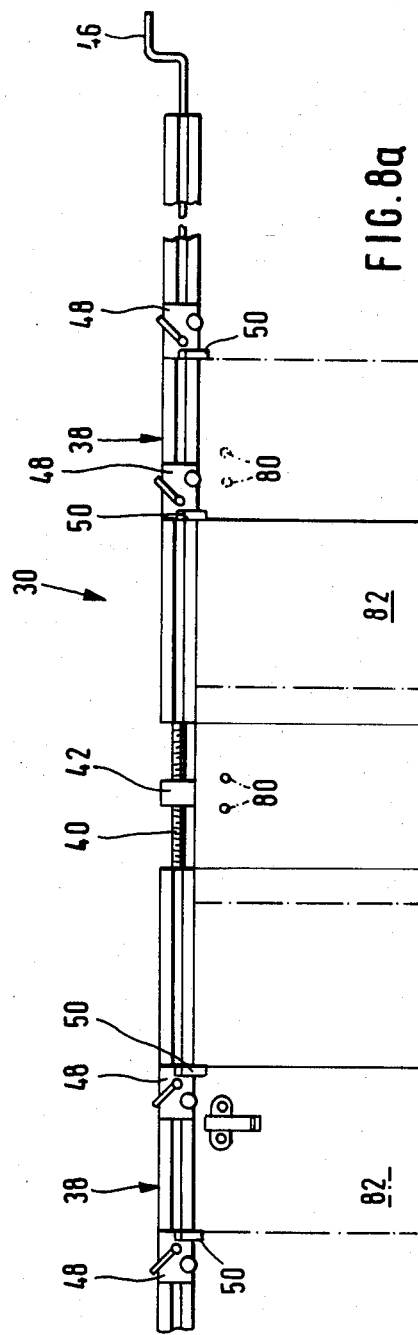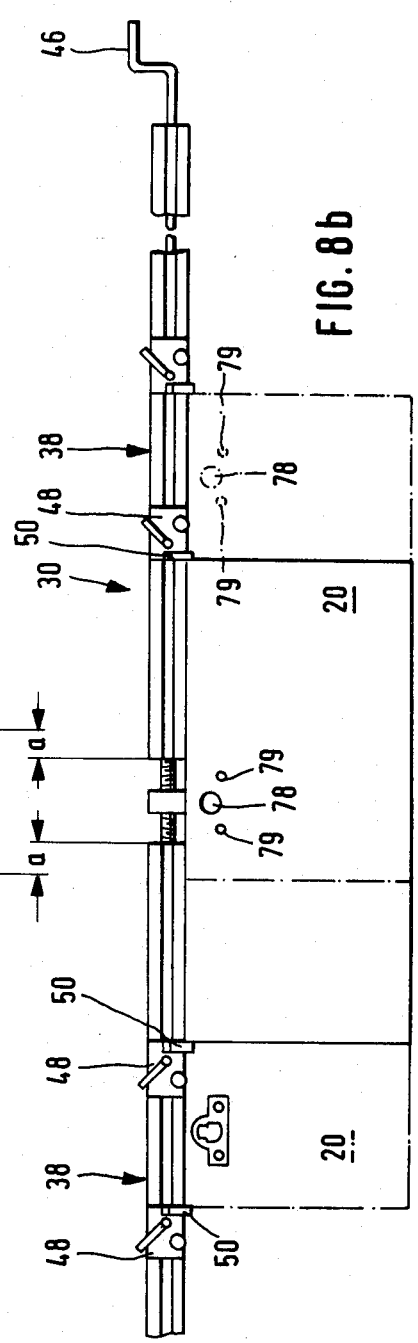

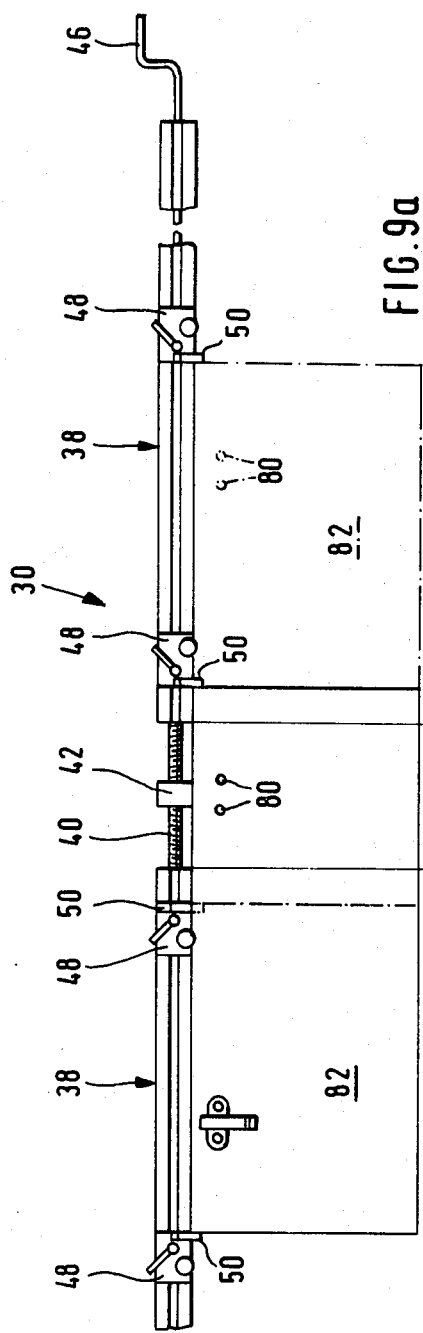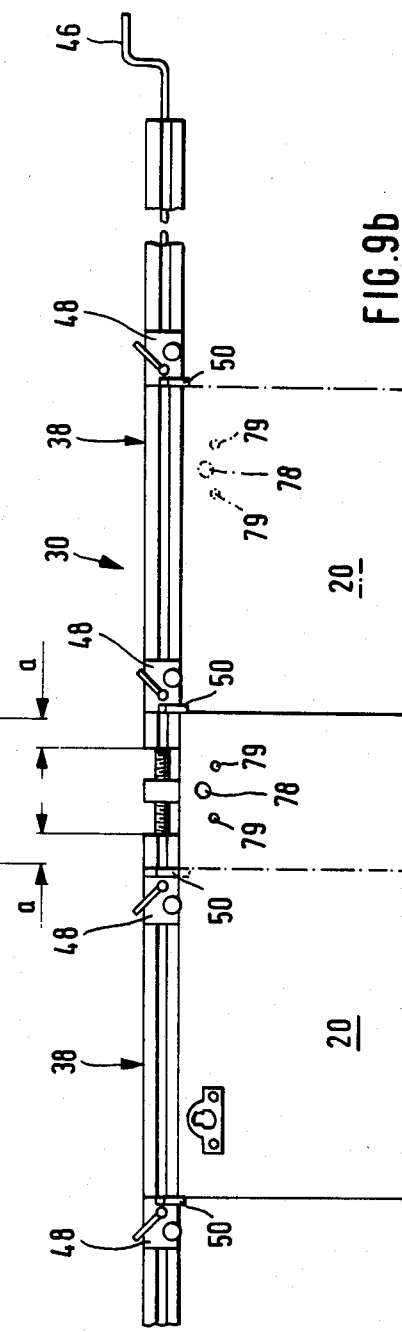

DRILLING AND BORING FIXTURE FOR FURNITURE HARDWARE PARTS

BACKGROUND OF THE INVENTION

The invention relates to a drilling and boring fixture for the adjustable clamping of board-like furniture parts on the work table of a machine for the drilling and boring of sockets or mounting holes in parts of furniture for the installation of furniture hardware.

Certain furniture hardware, such as hinges, joining devices and the like, must often be fastened in bores or mortises in two different board-like cabinet parts, such as for example a cabinet wall and a door leaf or two cabinet walls meeting at right angles, in which case the problem arises that the bores or mortises in the two furniture parts must be aligned precisely with one another, so that the hardware will fit correctly into the bores when the furniture is assembled later on. In the large series production of furniture, these mounting holes are produced on production lines with multiple tools which are precisely located on the parts to be worked and permit absolutely accurate automatic machining. For the production of furniture models in small series or in single units, such production lines are out of the question on account of the high invested costs, and also because the constant changeovers required in the production of furniture models in small series on such production lines requires too much labor. For such cases, therefore, relatively simple machines have been developed for drilling the mortises and mounting holes; such machines have multiple-spindle drill heads with which the larger socket bore for the hinge cup can be machined into door leaves, simultaneously with two additional lateral mounting holes for mounting screws or pins of modern cup hinges and also two holes for the mounting plates of such hinges. These machines are often provided also with a pressing means whereby the particular piece of hardware can be forced into the mounting hole after the latter has been drilled. In these relatively inexpensive machines, however, all that is established, or that can be quickly and easily adjusted, is the distance of the holes from the adjacent edge of the door leaf or cabinet wall, while the vertical location of the hole has to be measured and marked; this calls for time-consuming measurements, and still it is not possible to avoid errors. Consequently, the holes in two different furniture parts, such as for example the mortises in the door leaf for the hinge cups on the one hand and the mounting holes for the mounting plates of the corresponding hinges, may be out of alignment. Particularly when vertically spaced holes have to be produced on two associated furniture parts of different length for a plurality of hardware parts—for example when a door leaf has to be mounted by two or three hinges on a supporting wall of slightly greater height—there is danger of misalignment of the associated holes on the two furniture parts.

It is therefore the object of the invention to create a drilling and boring fixture which can be installed on the above-described machines for creating mortises and fastening holes, and which will permit a precise alignment of the furniture parts relative to the drill head on the work table of the machine such that the fastening holes which are about to be made in a furniture part will have the proper vertical spacing, and will furthermore be precisely aligned with the fastening holes previously made on the associated second furniture part.

THE INVENTION

This object is achieved by the invention in that, underneath the drill head of the machine, at the rearward longitudinal edge of its work table, aligned and longitudinally displaceable backstop rails rising slightly above the surface of the work table are disposed each at the same distance on opposite sides from a vertical plane passing centrally through the drill head. Into the ends of these backstop rails adjacent the drill head there are threaded the end sections of a threaded spindle provided with threads of equal pitch and contrary sense, and this spindle in turn is mounted rotatably on the work table but held against longitudinal displacement. Cursors are disposed on the top of the backstop rails, and these cursors are displaceable longitudinally along the backstop rails and can be locked on the backstop rails at given uniform distances apart. Each cursor bears a stop which is resiliently biased to a position projecting toward the surface of the work table but which can be forced back to the cursor against the spring bias. By rotating the threaded spindle, the backstop rails, together with the cursors locked on them with the stops, can be driven continuously by the same amount, either toward one another or away from one another, depending on the direction of rotation, which permits the adaptation of the distance between two stops on cursors on opposite rails to the height dimension of a board-like furniture part. The resiliently retractable arrangement of the stops on the cursors make it possible, on the other hand, to preset along the backstop rail a number of workpiece stop positions relative to the drill head, while the abutments of the cursors that are located in unnecessary stop positions cannot interfere with the placement of the furniture part in question, because the stops can be pushed back out of the way by the furniture part itself.

The backstop rails are best made from hollow, extruded metal stock. A drive spindle is inserted into the interior of one of the backstop rails, and one end is coupled for rotation with the associated end of the threaded spindle, while its other end remote from the drilling head is provided with a handle, a crank for example, for turning the threaded spindle. The precise positioning of a board-like furniture part between two stops preset on the backstop rails is thus accomplished by turning the crank that extends from the end of the one backstop rail.

In a desirable development of the invention, the backstop rails are provided, at least on their top surface, each with a continuous undercut longitudinal slot which is engaged in a dovetail-like manner by appropriately shaped projections on the underside of the cursors. The cursors are accordingly displaceable lengthwise of the slot, but secured against lifting from the top surface of the backstop rails.

To be able to lock the cursors, and thus the stops which they carry, at uniform intervals along the backstop rails, a row of holes drilled successively at uniform intervals along the length of the upper side of the backstop rails can be provided, which can be entered selectively by the bottom end of a pin mounted under resilient bias in each cursor for longitudinal displacement at right angles to the rail top, which pin can be retracted against its bias to a position in which it no longer projects from the bottom of the cursor.

The row of holes can be laterally offset, parallel to the longitudinal slot in the top of the rail, or the holes are drilled centrally into the top of the rail with a diameter that is greater than the width of the longitudinal slot. The distance between successive holes in the row on the backstop rail is preferably equal to the standardized hole spacing in rows of holes provided in cabinet walls for the accommodation of shelf holders and shelves.

To facilitate repeated settings for the drilling and boring of furniture parts of identical size, it is recommendable to provide the successive holes of the hole row in each backstop rail with progressive numbering and/or with data on the length of the furniture parts whose drilling and boring necessitates the locking of the associated cursor in the particular hole.

The cursors, in a desirable further development of the invention, have each a clamping means for fixation at arbitrary positions along the corresponding backstop rail, so that in special cases, when for example a door leaf is to be hung in an offset manner on a supporting wall, the size of the offset can be individually adjusted before the holes are drilled into the second furniture part.

This adjustment is facilitated if the backstop rails are each provided with a measurement scale for the precisely measured setting of the cursors at the intermediate positions by the clamping means.

It is desirable for at least one cursor equipped with a resilient stop to be associated with each backstop rail. But the fixture will be more universally and variously useful if two or more cursors provided with stops are associated with each backstop rail, and are pre-adjustable relative to the drilling head for the offset drilling or boring of holes in a furniture part to correspond to the different alignments of the furniture part.

DESCRIPTION OF A PREFERRED EMBODIMENT

The invention will be further explained in the following description of an embodiment, in conjunction with the drawing, wherein.

FIGS. 8a and 8b are diagrammatic top views of the fixture of the invention, FIG. 8a representing the setting of the abutments for the machining of a supporting wall and FIG. 8b the setting for the machining of a corresponding door leaf which is to be hung on the supporting wall by three hinges at different levels and which has smaller height dimensions than the supporting wall, and FIGS. 9a and 9b are diagrammatic top views of the fixture of the invention, FIG. 9a representing the setting of the abutments for the machining of a supporting wall and FIG. 9b the setting for the machining of a corresponding door leaf which is to be hung on the supporting wall by two hinges at different levels and which has smaller height dimensions than the supporting wall.

Figure 1:
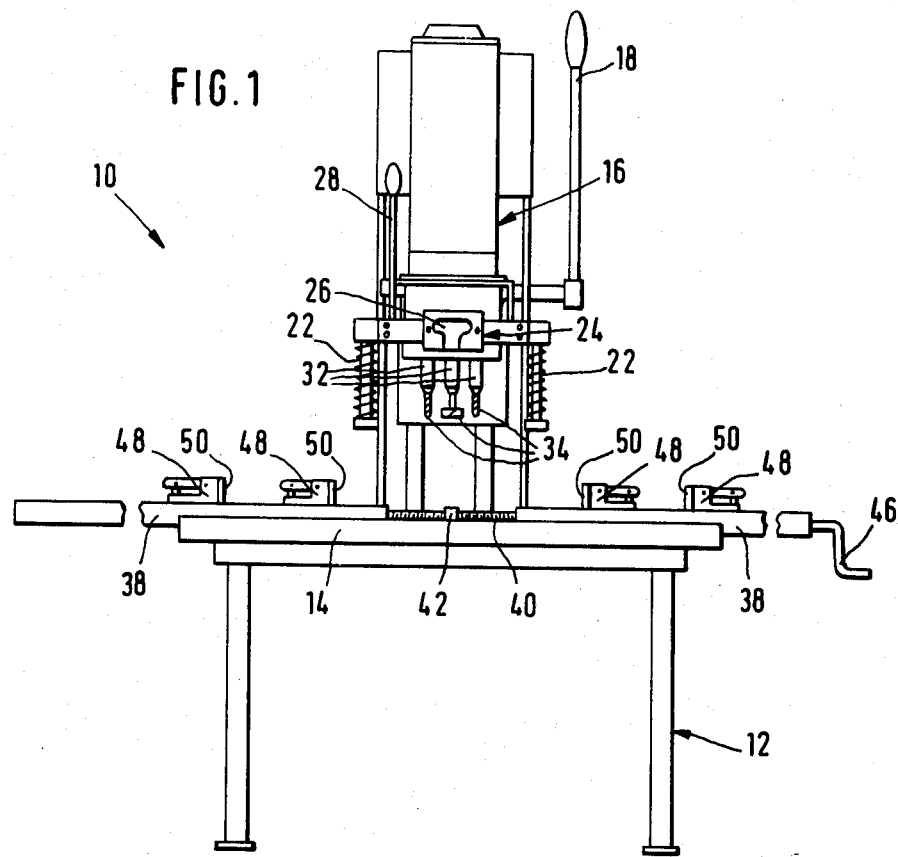
FIGS. 1 and 2 are a diagrammatic front elevation and plan view, respectively, of a machine provided with the fixture of the invention for creating mortises and fastening holes in board-like furniture parts.
Figure 2:
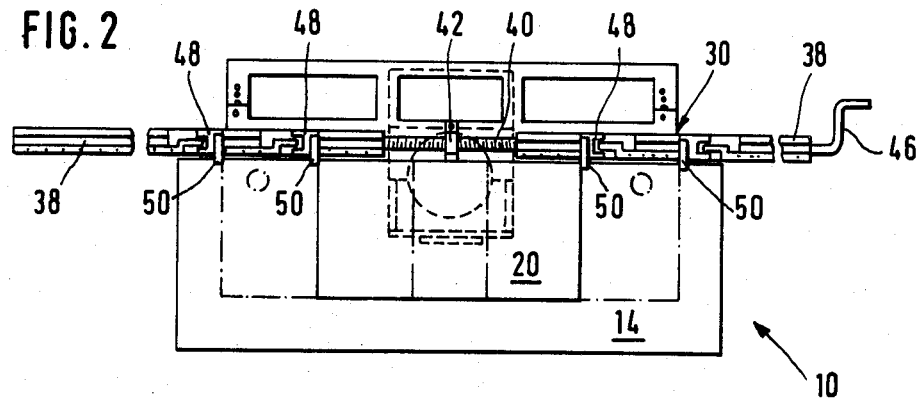

The machine shown diagrammatically in FIGS. 1 and 2 and generally designated by the number 10 is designed for the drilling of mortises and mounting holes in board-like furniture parts. It has a frame 12 which bears a work table 14 and an electrically driven multiple-spindle drill unit 16 which can be raised or lowered by a hand lever 18 or pneumatically against a board-like furniture part laid on the work table. It has resilient hold-downs 22 which, when the drill of the drill unit 16 is lowered, engage the surface of the furniture part 20 and hold it tightly on the work table while it is being drilled. Also provided on the drill head is the ram 24 for the purpose of forcing furniture hardware parts at least partially into the fastening holes after the latter have been drilled. The receptacle 26 for the furniture hardware parts is normally swung forward to the position shown in FIG. 1, in which the hardware parts can easily be inserted into it, but it can be swung downwardly by means of the hand lever 28 to a position in alignment with the previously drilled holes, after which the hardware part held in the receptacle 26 can be forced into the previously drilled holes by operating the hand lever 18. To this extent the machine 10 is known and therefore need not be further described.

Figure 3:
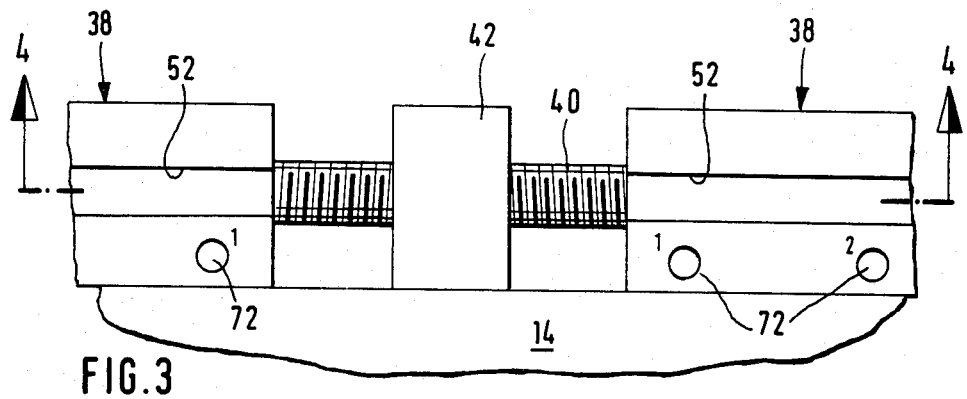
FIG. 3 is a plan view on an enlarged scale of the end portions of the backstop rails of the fixture, which are coupled together by a threaded spindle.
Figure 4:
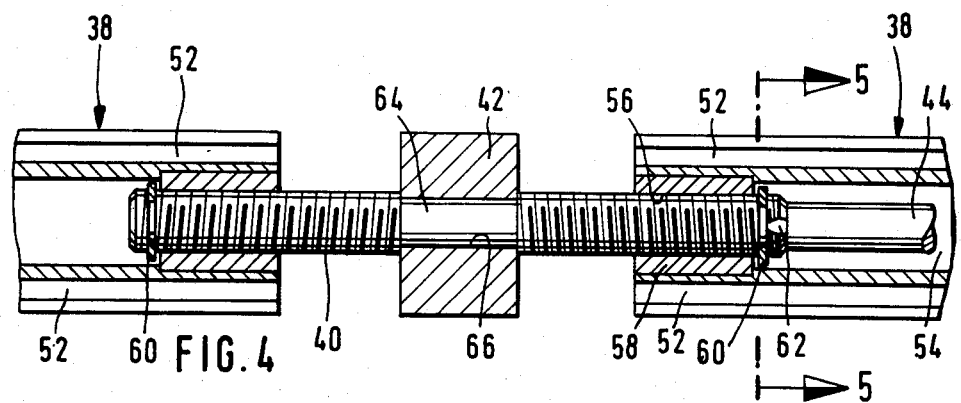
FIG. 4 is a cross-sectional view seen in the direction of the arrows 4—4 of FIG. 3.

Below the drilling machine unit 16 there is disposed, on the rear longitudinal edge of the work table 14, the fixture 30 of the invention, which has essentially two backstop rails 38 disposed equidistantly on opposite sides of a vertical plane passing centrally through the drilling head 16 holding the drill spindles 32 containing the drills 34; these backstop rails are mounted in alignment with one another for longitudinal displacement along the rear edge of the work table 14. The backstop rails project above the table 14 and thus form a support on which the furniture parts 20 or 82 (FIGS. 8a and 8b) can be laid. The opposite halves of a threaded spindle 40 provided with contrary threading of the same pitch are threaded into the confronting ends of the backstop rails 38 (see also FIGS. 3 and 4); the threaded spindle is in turn mounted at its center in a bearing block 42 disposed on the frame 12 or in the work table 14, so as to be able to rotate but remain longitudinally fixed.

A driving spindle 44 is carried through the hollow interior of the backstop rail 38 on the right side of the drawing, and is corotational with the confronting end of the threaded spindle 40, so that the threaded spindle can be turned in one or the other direction by turning the crank 46 attached to the opposite, free end of the driving spindle 44, thereby causing the backstop rails 38 in threaded engagement with the halves of the threaded spindle 40 to move continuously together or apart, depending on the direction in which the threaded spindle 40 is turned.

On the top of the backstop rails, cursors 48—two pairs in this embodiment—are displaceable longitudinally and can be fixed to the rails at given equal intervals, a stop 50 being provided on each cursor 48, which is biased resiliently to a position in which it projects past the face of the backstop rail 38 toward the surface of the work table 14, but from which it can be pushed back against the spring bias to a position in which it does not project beyond the backstop rail 38.

Figure 5:
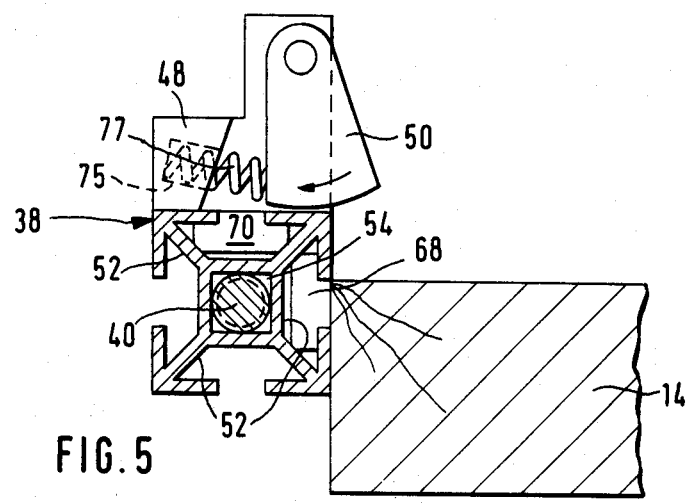
FIG. 5 is a cross-sectional view seen in the direction of the arrows 5—5 of FIG. 4, showing additionally on the cross-sectioned backstop rail a cursor provided with a spring-biased stop.

The backstop rails 38 of the fixture 30 are formed, in the case of the illustrated embodiment, as extruded metal shapes having the cross-sectional form shown in FIG. 5, forming an undercut longitudinal slot 52 in each flat side, plus a central cavity 54 of square cross section running lengthwise through each backstop rail. At each of the confronting ends of the backstop rails 38, a nut 58 having a thread matching the thread of the corresponding spindle half is fastened in the cavity 54, and, when the threaded spindle 40 is turned, is driven in the one or the other direction, depending on the sense of rotation, and carries with it the associated backstop rail 38. A stop ring 60 placed on each end of the threaded spindle prevents the unintentional complete unscrewing of the threaded spindle 40 from the nut 58.

The threaded spindle 40 is turned, as mentioned above, through the driving spindle 44 which is provided on its end abutting the threaded spindle with a projection 62 of polygonal cross section, which engages a complementary socket in the end face of the threaded spindle 40.

The rotatable, but longitudinally nondisplaceable mounting of the threaded spindle 40 in the bearing block 42 is produced by turning the middle section 64 of the threaded spindle to a smaller diameter, and placing this cylindrical section 64 in a complementary bearing bore 66 in the bearing block 42.

Figure 4A:
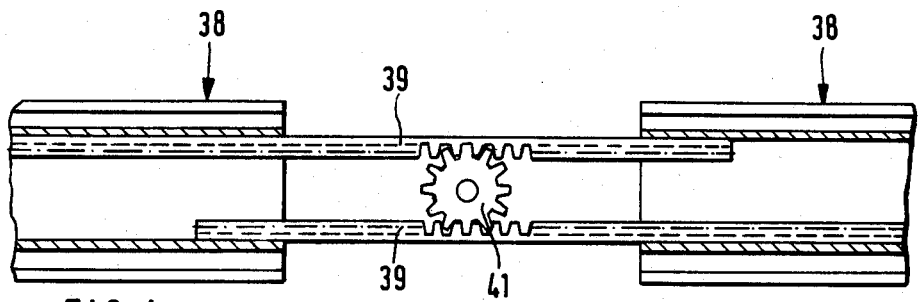
FIG. 4a is a cross-sectional view corresponding to that of FIG. 4, taken through the ends of the backstop rails which in this case are coupled by a rack-and-pinion drive.

A variant method of coupling the two bearing rails 38 together such that they can be displaced in the one or other direction is indicated diagrammatically in FIG. 4a. Instead of the threaded spindle 40, a rack 39 is attached to each of the confronting ends of the backstop rails 38, and these racks mesh with a common pinion 41 which is mounted undisplaceably on the work table 14 for rotation about a horizontal axis. If the shaft of the pinion 41 pointing toward the front edge of the work table is prolonged by a driving spindle projecting beyond this front edge of the work table and provided with a crank on its free end, the backstop rails 38 can be adjusted longitudinally in the same manner as in the case of the previously described embodiment, although the adjustment can then be performed from the front and center of the work table.

The backstop rails 38 are mounted displaceably on the work table by means of one T-bar 68 each, which is fastened to the rear edge of the table and is fitted into the corresponding undercut slot 52, and the cursors 48 are displaceably guided on the top of the backstop rails in the same manner by a projection 70 extending from the bottom, shaped in the same manner, and engaging the corresponding undercut slot 52 (FIG. 5).

Figure 6:
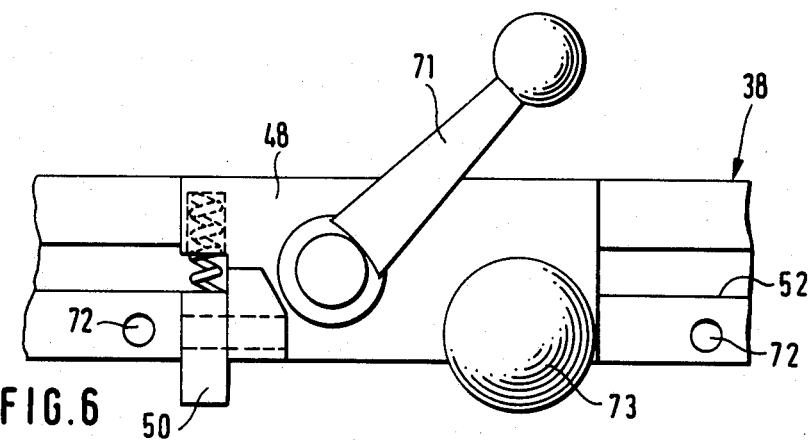
FIGS. 6 and 7 are plan and front views, respectively, of the cursor represented in FIG. 5.
Figure 7:
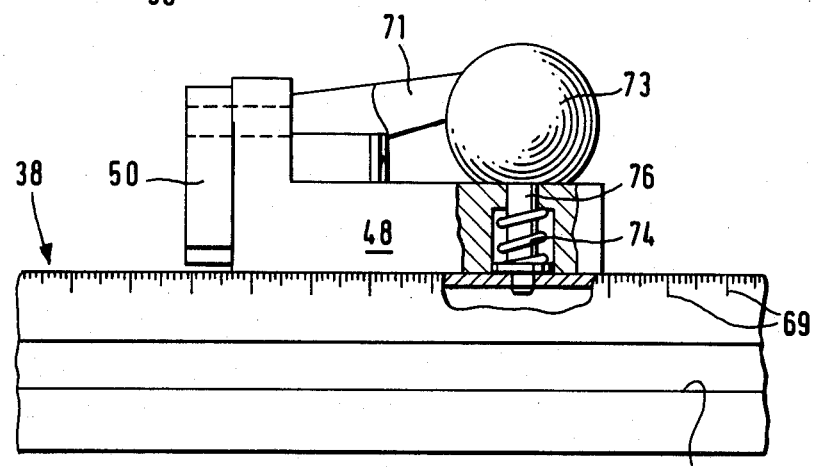

Alongside the longitudinal slot 52, there is provided on the top of the backstop rails a row of holes 72 drilled at equal intervals, which can be entered by the bottom end of a pin 76 mounted in each cursor for longitudinal displacement at right angles to the top of the backstop rails, such pins being made by a spring 74 to project from the bottom of each cursor. A knob 73 is provided on the end of pin 76 projecting from the top of the cursor, to serve for pulling the pin out of the holes 72. In FIGS. 6 and 7, there is also shown the operating lever 71 of a clamping device, which otherwise is not shown in greater detail, in the form, for example, of a cam engaging the undercut longitudinal slot 52, and by means of which the cursor 48 can be locked even in intermediate positions between two positions for the engagement of the pin 76 in the holes 72 on the backstop rail 38.

The stop 50, in the embodiment shown in FIGS. 5 to 7, is pivoted about a horizontal shaft on the cursor 48 and is biased by a compression spring 77 supported at one end on its back and at the other end in a bore 75 provided in the cursor, toward a position projecting over the work table 14, but it can be swung back against the spring bias by pressing on its front edge.

It is apparent that, within the scope of the idea of the invention, modifications and further developments of the fixture 30 of the invention can be made, relating both to the configuration of the backstop rails 38, such as their cross-sectional shape for example, and to the manner in which they are displaceably disposed on the work table 14, and to the method of the displaceable mounting of the cursors 48 on the backstop rails 38 so that they can be locked at given intervals. Alternative methods are also conceivable for the retractable disposition of the stops 50 on the corresponding cursor 48. For example, the stops could also be carried on the cursor for displacement in a horizontal plane. The use of different cursor-stop units is also conceivable. In the case of units which are to be provided far out on the backstop rails 38, in which the resilient retraction of the stop is not necessary, consideration might be given to the rigid fastening of the stop to the cursor or to constructing the two components in one piece.

The operation of the fixture of the invention will be further described in conjunction with two different drilling and boring jobs. First, in conjunction with FIG. 2, an explanation will be given of drilling into the back of the furniture part 20, which thus might be a door leaf to be hung on a cabinet carcass by three hinges arranged vertically one above the other at equal intervals, for the purpose of creating cup-shaped mortises to accommodate the cup-like door-related parts of the cabinet hinges. For this purpose, first the inner cursors 48 nearer the drilling head are slid on the two backstop rails 38 and locked so that they are at a distance apart corresponding approximately to the height of the door leaf, the drilling head being situated centrally between the cursors 48 and thus between the facing surfaces of the stops 50. Then the door leaf 20 is placed on the work table with its back up in the manner represented in FIG. 2 and pushed against the backstop rails 38. By turning the crank 46, the backstop rails and thus the inner cursors are then shifted toward one another on the work table 14 such that the facing surfaces of the stops 50 firmly engage the top and bottom edges of the door leaf and thus align the door leaf centrally underneath the drilling head. By lowering the running drilling machine unit 16 by means of the hand lever 18, the cutter 34 inserted into an associated drill spindle 32 is lowered against the back of the door and mills (or drills) the first cup bore 78 halfway up the door leaf 20.

The outer cursors 48 are each preset on its corresponding backstop rail 38 at such a distance from the drilling head or cutter 34 that, after the door leaf 20 is removed from between the stops 50 of the inner cursors 48 and shifted to the position represented in broken lines in contact with the abutment surface of the outer left stop 50, and simultaneously pressed against the backstop rail 38, the cup mortise 78 which is now to be made in the vicinity of the right (bottom or top) edge of the door leaf can be produced. Lastly, the third cup mortise 78 is cut, and for this purpose the door leaf 20 is placed in like manner against the abutment surface of the outer stop 50 on the right backstop rail 38 and at the same time pressed against the backstop rail 38. During the actual drilling or boring process, pressure on the door leaf 20 is unnecessary, because the resilient hold-downs 22 of the drilling machine unit 16 hold it firmly on the work table 14. The installation of the hinge cup in the cup mortise can be performed immediately following the cutting of the mortise by means of the pressing device described above. In this manner the cup mortises 78 and thus also the hinge cups inserted into them are installed at precisely defined locations at intervals precisely defined by the predetermined spacing of the holes 72 in the rows in the backstop rails 38.

If this door leaf is then to be mounted on a cabinet carcass by means of the cup hinges, and the supporting walls are provided with the usual rows of holes to accommodate shelf supports, and the spacing of these holes is the same as the spacing of the holes 72 of the hole rows in the backstop rails 38, the holes in the supporting wall row of holes can be used for installing mounting plates in the form of so-called wing plates, i.e., the making of specially adapted mounting holes in the supporting wall can be omitted in this special case.

In FIGS. 8a and 8b the drilling and boring job described above is expanded in that, in addition to the drilling of three cup mortises 78 at intervals vertically, including two additional lateral holes 79 for additional dowel-like pins for mounting the hinge cup in a door leaf (FIG. 8b), the drilling of the associated fastening holes 80, each for a mounting plate, again in the form of a wing plate, in the corresponding supporting wall 82 (FIG. 8a) is to be described, which in turn is of a height that is greater than that of the door leaf 20 by the amount 2a. When the cup mortises 78 and the fastening hole 79 are drilled into the door leaf 20 (FIG. 8b), the procedure is the same as that described above in conjunction with FIG. 2, i.e., first the middle cup mortise 78 with the fastening holes 79 is made, and then the holes 78, 79 at the other levels.

For the drilling of the corresponding fastening holes 80 in the supporting wall, the procedure is virtually the same with the same setting of the stops 50, the backstop rails 38 being separated by turning the crank 46 to such an extent that the supporting wall, now higher by the amount 2a, fits between the stops 50 that are then cooperating. Since the supporting wall 82 is then again supported centrally between stops 50 during the drilling of the middle fastening hole, these stops each being disposed on the other backstop rail, and the backstop rails are displaced contrariwise by the same amount when the crank is turned, the position of the fastening bores 80 in line with the holes 78 and 79 in door leaf 20 is preserved unaltered, i.e., despite different heights, the bores in the door leaf 20 and the corresponding supporting wall 82 can be drilled with the same setting of the cursors.

In FIGS. 9a and 9b the above-described drilling job is modified in that the holes 78 and 79 are to be made in the door leaf 20 and the holes 80 are to be made in the corresponding supporting wall, which is longer by the amount 2a, but instead of three sets only two sets of holes are to be made, one near the top and one near the bottom edge of the door leaf 20 and supporting wall 82, i.e., the door leaf is to be hung on the associated supporting wall with only two hinges. Thus, the middle fastening holes (halfway up) which were drilled first, in the description given in conjunction with FIGS. 8a and 8b, after the door leaf and supporting wall had been centrally aligned on the work table, are omitted.

To bore the cup mortise 78 and the fastening holes 79 into the door leaf 20 (FIG. 9b), the cursors 48 on the backstop rails 38 are therefore so adjusted that the stop 50 of the inner cursor of the one backstop rail 38, with the stop on the outer cursor of the other backstop rail, align the door leaf 20 between them approximately in the manner represented in the left half of the drawing, to one side of the center of the work table, the precise adaptation of the spacing of the stops 50 being again obtained by turning the crank 46. After the holes 78 and 79 have been made in the end area of door leaf 20 situated on the right in the drawing, the door leaf is shifted to the stop position indicated in broken lines in the drawing, in which it is held between the stops of the other two cursors such that now the holes 78 and 79 can be made in the area of the left edge of the door leaf as seen in the drawing.

To drill the corresponding fastening holes 80 in the supporting wall 82, one proceeds again in the same manner, and with the stops 50 in the same setting, the backstop rails 38 being again drawn apart by turning the crank 46 until the supporting wall, which is longer by the amount 2a, fits between the cooperating stops 50.

If in special cases the hanging of the door leaf on the supporting wall is to be slightly shifted apart as regards their horizontal central axes, allowance can be made for this by setting the cursors with the desired offset before drilling the supporting wall fastening holes 80, while the scale 69 permits the precise setting of the amount of displacement and the clamping means permit the cursors 48 to be set outside of the given detent positions by using their actuating levers 71.

The procedure described in conjunction with FIGS. 9a and 9b for producing the outer fastening bores adjacent the outer transverse edges can be used also for drilling cup mortises and/or fastening holes in door leaves and supporting walls of very great height, for room-height built-in closets for example, and the rest of their holes are made by the procedure explained in conjunction with FIGS. 8a and 8b.

I claim:

1. A fixture for adjustably mounting a board-like furniture part on a machine having a work table and a drill unit having at least one rotatably driveable tool for making holes or recesses in a flat surface of the furniture part, said unit being arranged in vertically spaced relationship above the upper surface of said work table and vertically movable such that the at least one tool may be lowered onto a furniture part supported on said work table, said fixture comprising: two stop rails mounted at a longitudinal edge of the work table in alignment with each other, and slightly above the upper surface of the work table to form a back stop for the furniture part; means for longitudinally displacing said stop rails equidistantly on opposite sides of a vertical plane centrally through the drill unit at right angles to the longitudinal edge; said displacing means including a threaded spindle having a central section to be mounted longitudinally non-displaceably, but rotatably, relative to said work table; said spindle having sections connected to said central section on opposite sides thereof; with threads of opposite and equal pitch and respectively threadedly engaging said two stop rails; at least one cursor disposed on each top rail for longitudinal displacement with respect thereto; means for fixing said cursors on the respective stop rail at uniform given distances; a stop on each cursor; and means for biasing each stop toward a position protruding over the work table upper surface, each stop being retractable into the respective cursor against said biasing means.

2. A fixture according to claim 1, wherein each stop rail is a hollow metal extrusion, a first cavity in one of said stop rails, a drive spindle passing through said cavity and having one end coupled for rotation with the threaded spindle, another end extending beyond said one stop rail, and means for turning said drive spindle.

3. A fixture according to claim 1, wherein each rail has an upper side with a through-going, undercut longitudinal slot, and wherein each cursor has a bottom side with a dovetail-like projection engaging said slot.

4. A fixture according to claim 3, wherein the upper side of each stop rail has a row of holes at equal intervals in longitudinal direction, and wherein said bottom side of each cursor has a pin, means for biasing said pin into one of said holes, each pin being held in a longitudinally displaceable manner in each cursor at right angles to the upper side of the rail, and being retractable into the cursor against the biasing means.

5. A fixture according to claim 4, wherein successive holes of said row of holes are provided with progressive indicia.

6. A fixture according to claim 1, comprising means for clamping the cursors in any desired position on the respective stop rail.

7. A fixture according to claim 6, comprising a scale on each rail for the precise adjustment of the cursors in intermediate positions set by said clamping means.

8. A fixture according to claim 1, wherein at least two cursors are disposed on each stop rail.

* * * * *